United States Patent [19]

Spitler et al.

[11] Patent Number: 6,166,109
[45] Date of Patent: Dec. 26, 2000

[54] SYNTACTIC RIGID PUR/PIR FOAM BOARDSTOCK

[75] Inventors: Kieth G. Spitler; William J. Nicola, both of Burgettstown; Carl E. Holsinger, Freedon, all of Pa.

[73] Assignee: Bayer Corporation, Pittsburgh, Pa.

[21] Appl. No.: 09/159,014

[22] Filed: Sep. 23, 1998

Related U.S. Application Data

[63] Continuation-in-part of application No. 08/909,447, Aug. 11, 1997, abandoned.

[51] Int. Cl.[7] .............................. C08J 9/32; C08L 75/04; C08G 18/00
[52] U.S. Cl. .......................... 523/218; 523/219; 521/54; 521/137; 521/155
[58] Field of Search ................ 521/54, 56, 137, 521/155, 170; 523/218, 219

[56] References Cited

U.S. PATENT DOCUMENTS

| | | | |
|---|---|---|---|
| 3,510,392 | 5/1970 | D'Eustachio et al. | 161/162 |
| 4,038,238 | 7/1977 | Cravens | 260/33.6 UB |
| 4,082,702 | 4/1978 | Harper | 260/2.5 AK |
| 4,303,729 | 12/1981 | Torobin | 428/327 |
| 4,303,736 | 12/1981 | Torobin | 428/403 |
| 4,829,094 | 5/1989 | Melber et al. | 521/57 |
| 4,843,104 | 6/1989 | Melber et al. | 521/54 |
| 4,902,722 | 2/1990 | Melber | 521/54 |
| 4,916,173 | 4/1990 | Otloski et al. | 523/219 |
| 4,959,395 | 9/1990 | Janda | 521/54 |

FOREIGN PATENT DOCUMENTS 1200063   7/1970   United Kingdom.

OTHER PUBLICATIONS

Chemical Abstracts, vol. 118, No. 22, May 31, 1993, Abstract No. 214484.

*Primary Examiner*—Tae Yoon
*Attorney, Agent, or Firm*—Joseph C. Gil; Noland J. Cheung; N. Denise Brown

[57] ABSTRACT

The present invention relates to the use of hollow microspheres filled with a hydrocarbon, to introduce uniform cell geometries in syntactic foams having a bimodal cell structure. The rigid foam product includes from 20 to 80 percent by weight of the hollow microspheres, the microspheres having average diameters ranging from 80 to 200 microns. The microspheres are encapsulated from 80 to 20 percent by weight of a closed cell polyurethane foam, the cells of the foam having average diameters from 0.01 to 60 microns.

11 Claims, 5 Drawing Sheets

SYNTACTIC RIGID PUR/PIR FOAM BOARDSTOCK

This application is a Continuation-In-Part application of U.S. Ser. No. 08/909,447, filed Aug. 11, 1997 now abandoned.

FIELD OF THE INVENTION

The present invention relates to a rigid polyurethane/polyisocyanurate foam product having a high compressive strength comprising the use of microspheres. In particular, the foam is syntactic, closed cell and is bimodal in structure.

BACKGROUND OF THE INVENTION

Rigid foams and processes for their production are well known in the art. Such foams are typically produced by reacting a polyisocyanate with an isocyanate reactive material such as polyol in the presence of a blowing agent.

In recent years, the substantial increases in costs of the basic materials used to make foam, has encouraged the development and use of filler materials to reduce the amount of the basic materials used and the weight of the finished materials. One of the suggested filler materials and insulating materials utilizes hollow microspheres.

The use of hollow microspheres in foam is known in the art. The use of microspheres, however, in a syntactic foam having a bimodal cell structure is neither disclosed nor suggested by the art.

The expression "syntactic" as used herein refers to the use of hollow spheres in a polymer matrix to produce a cellular material.

The expression "PUR/PIR foam" refers to polyurethane and/or isocyanurate foam produced by generation of gas bubbles during reaction of the polymer matrix.

The expression "hybrid" as used herein refers to the simultaneous use of hollow spheres and PUR/PIR foam to produce a syntactic foam.

The expression "bimodal cell size" refers to a hybrid foam wherein the hollow spheres have a median diameter of about twice that of the cell diameter of the foamed matrix.

Expanded microspheres consisting of a synthetic thermoplastic resin shell that encapsulates a liquid blowing agent are known. See e.g., U.S. Pat. Nos. 4,829,094, 4,843,104 and 4,902,722.

In Melber, et al. (U.S. Pat. Nos. 4,829,094 and 4,843,104), a syntactic-polymer foam composition having a low density filler containing free flowing microspheres is disclosed. Melber, et al., however, does not disclose or suggest a bimodal cell structured foam.

Otloski, et al. (U.S. Pat. No. 4,916,173) discloses a polyurethane composition for a millable modeling stock application having hollow microspheres. Otloski, et al., however, discloses a solid polymer matrix and does not disclose a bimodal cell structure. Janda (U.S. Pat. No. 4,959,395) also discloses a solid polymer matrix and not a foam with a bimodal cell structure.

The two patents to Torobin (U.S. Pat. Nos. 4,303,729 and 4,303,736) disclose the use of hollow plastic microspheres as filler materials in plastics. Each of these patents does not disclose the bimodal cell structure. Additionally, the Torobin patents disclose large diameter microspheres in the range of 200 to 10,000 microns.

Cravens (U.S. Pat. No. 4,038,238) discloses hollow microspheres having lower loadings of 2 to 5 percent by weight of the total composition. Additionally, Cravens does not disclose a foam having a bimodal cell structure.

Harper (U.S. Pat. No. 4,082,702) discloses a rigid syntactic foam comprising glass microballoons. Harper, however, does not disclose a foam having a bimodal cell structure.

It has now been found that the use of hollow microspheres in a syntactic PUR/PIR foam having a bimodal cell structure results in improved compressive strength, additionally, the foams have reduced k-factor aging losses and flammability since the blowing agent is encapsulated in a microsphere.

SUMMARY OF THE INVENTION

It is an object of the present invention to provide a rigid foam product that would have a reduced density while maintaining the k-factor of the product.

It is also an object of the present invention to provide a rigid foam product having higher compressive strength at a given density when compared with typical foams.

It is a further object of the present invention to provide a safer product by reducing the flammability of the foam.

These and other objects, which will be apparent to those skilled in the art, are accomplished by the use of hollow microspheres filled with a hydrocarbon, air or vacuum to introduce uniform cell geometries in foams. The rigid foam product comprises from 20 to 80 percent by weight of the hollow microspheres, the microspheres having average diameters ranging from 80 to 200 microns. The microspheres are encapsulated from 80 to 20 percent by weight of a closed cell polyurethane or polyisocyanurate foam, the cells of the foam having average diameters from 0.01 to 60 microns, wherein the ratio of the microsphere diameter to the cell diameter is at least 2:1.

The narrow microsphere diameter distribution, coupled with the very fine cells generated by the $CO_2$ in the PUR/PIR foaming reaction, create a bimodal syntactic foam structure. Such a structure will have a higher compressive strength at a given density when compared with the typical foam. Also, because the hydrocarbon, if present, is encapsulated in the hollow microsphere, flammability will be reduced and the k-factor retention is improved.

DETAILED DESCRIPTION OF THE INVENTION

The present invention is directed to an improved rigid foam product comprising microspheres.

The hollow microspheres used herein are known. Commercially available microspheres include Expancel 551 DE, which is available from Expancel Inc.; Z-Light W-1000 from Zeelan Industries; Dualite M6032AE, which is from Pierce & Stevens Corporation; Scotchlite S-series, which is from 3M; and QCEL 300 and QCEL 650, which are available from the PQ Corporation. The Expancel and Dualite type microspheres are both expandable and hollow microspheres consisting of a thin shell of a copolymer of vinyl chloride, vinylidene chloride, and/or acrylonitrile, the shell of the Z-Light W-1000 microsphere is ceramic and the Scotchlite and QCEL microspheres consist of glass shells. The interior of the Expancel and Pierce & Stevens microspheres typically contain a volatile hydrocarbon, which is typically isobutane, isopentane or cyclopentane, but also could be made with custom low boiling solvents, if necessary. The ceramic and glass microspheres usually contain air, but may contain vacuum. In the example of a polymeric shell, when the microsphere is heated, the polymeric shell gradually softens, the volatile hydrocarbon evaporates, thus expanding the microspheres.

It is typical of available microspheres that a given sample contains a range of sizes. The microspheres used in this invention are hollow microspheres with a mean diameter of between 80 to 200 microns, preferably 100 to 140 microns. The density of polymeric, glass and ceramic microspheres range from 0.01 to 0.4 g/cc, 0.1 to 0.5 g/cc and 0.4 to 0.7 g/cc, respectively.

The addition of the amount of microspheres is such that the weight percent of the microspheres to the foam product is 20 to 80 percent by weight of the hollow microspheres. Preferably, the weight percent of the microspheres is from 40 to 60 weight percent.

The microspheres are encapsulated, from 80 to 20 percent, by weight of a closed cell PUR/PIR foam. For example, if the amount of microspheres in the foam product is 20 percent, the remaining 80 percent is the closed cell PUR/PIR foam. Conversely, if the amount of the microspheres in the foam product is 80 percent, the remaining 20 percent is the polyurethane foam.

The foam of the present invention is a closed cell polyurethane or polyisocyanurate foam such that the diameter of the cells of the foam range from 0.01 to 60 microns. Preferably, the diameter of the cells range from 0.5 to 30 microns.

Figure 1:
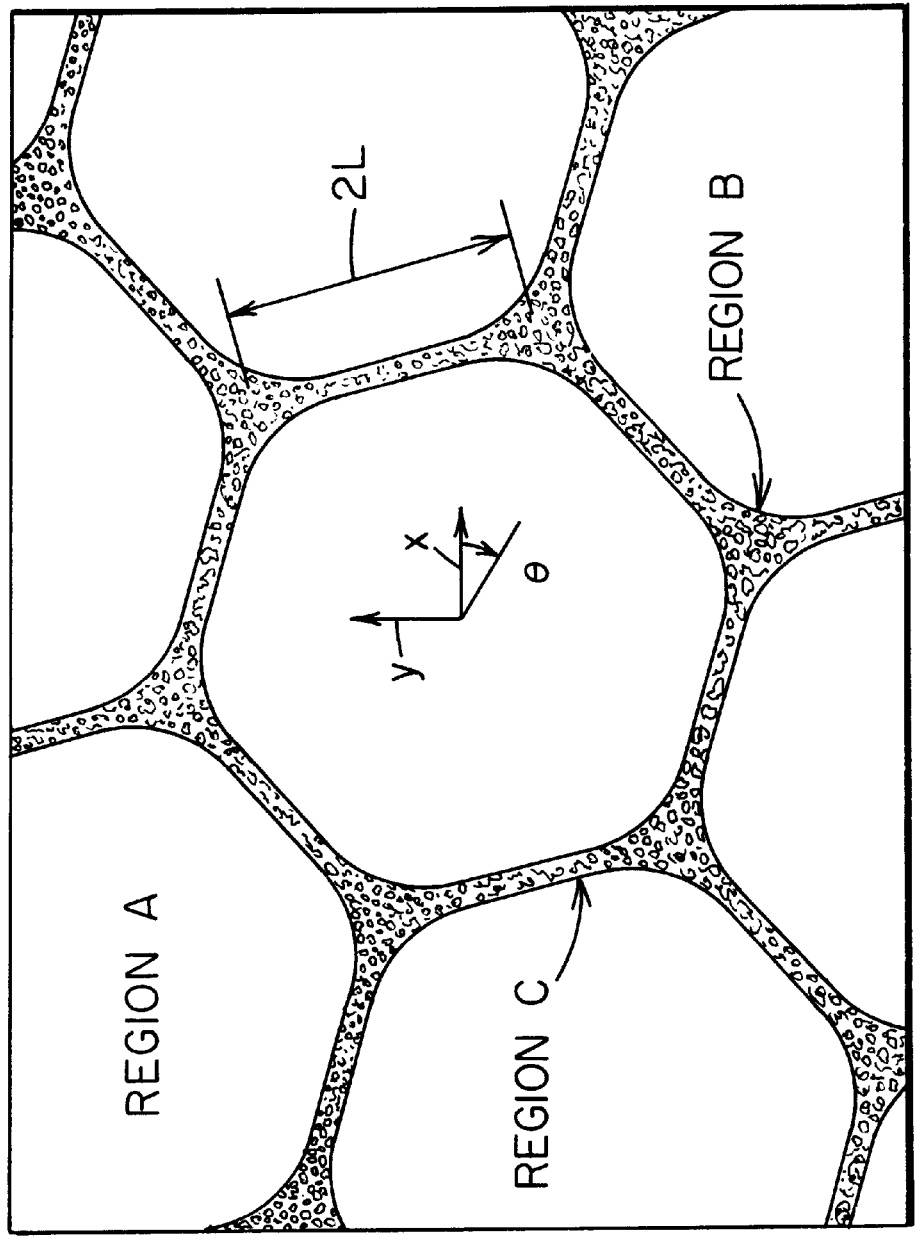
FIG. 1 is a diagram of a portion of the present syntactic foam wherein the bimodal cell structure is shown between the fine cells of the foamed matrix and the microsphere.
Figure 2A:
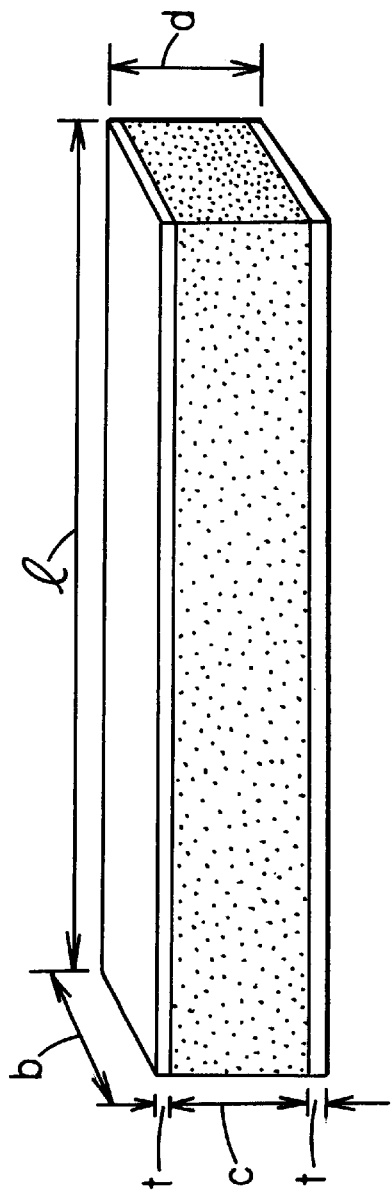
FIG. 2a is a diagram showing a cross-sectional view of a sandwich beam showing the small PUR/PIR cells between the shells of the microspheres.
Figure 2B:
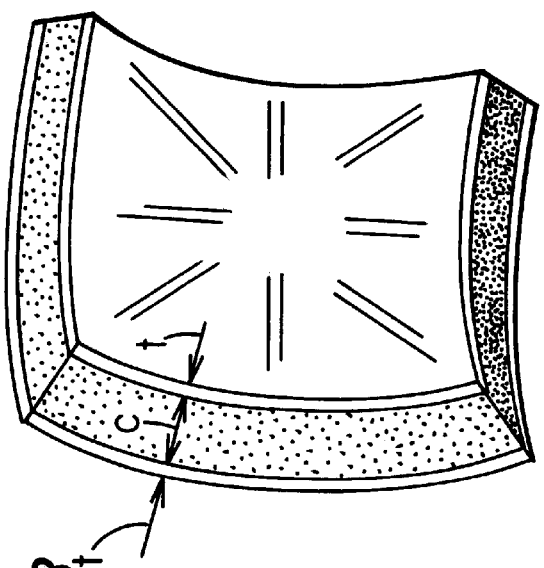
FIG. 2b is a diagram showing how the compressive strength is increased in the present invention by making a sandwich beam from the small PUR/PIR cells between the shells of the microspheres.
Figure 3:
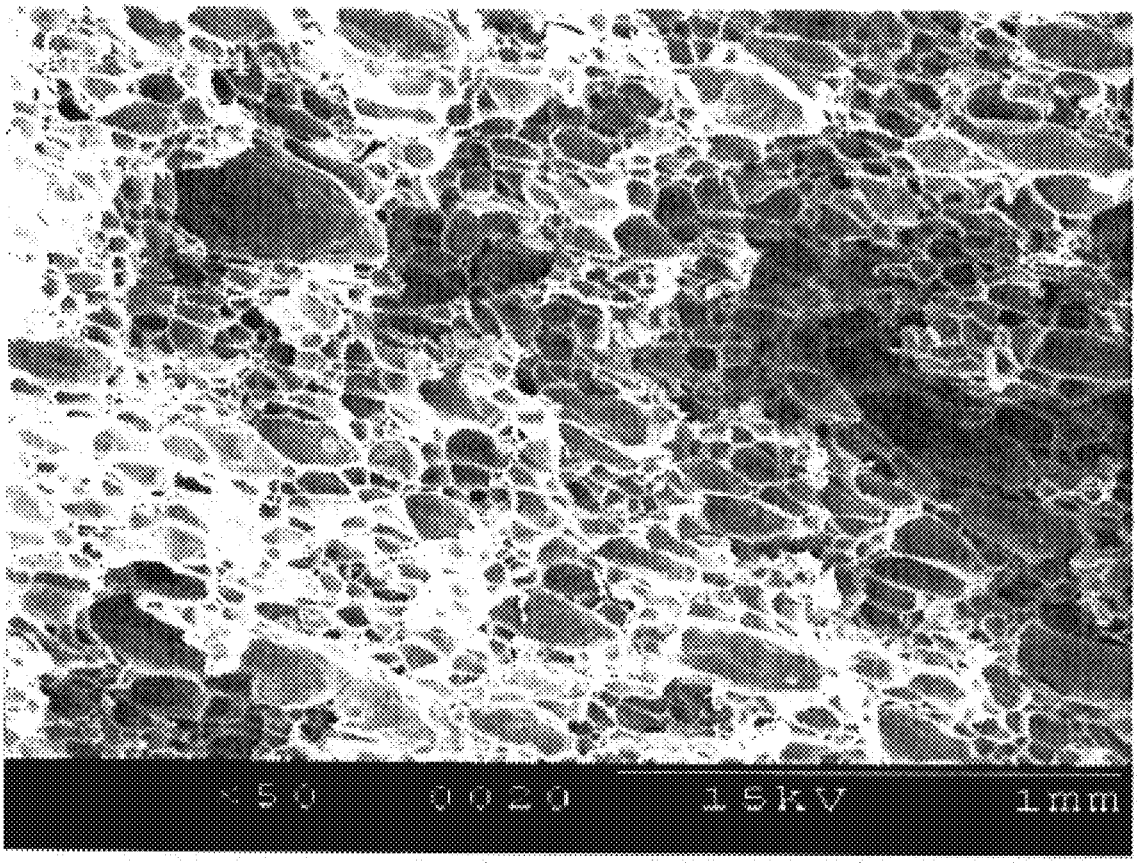
FIG. 3 is a micrograph of a typical, non-syntactic PIR foam with random and widely distributed cell sizes.
Figure 4:
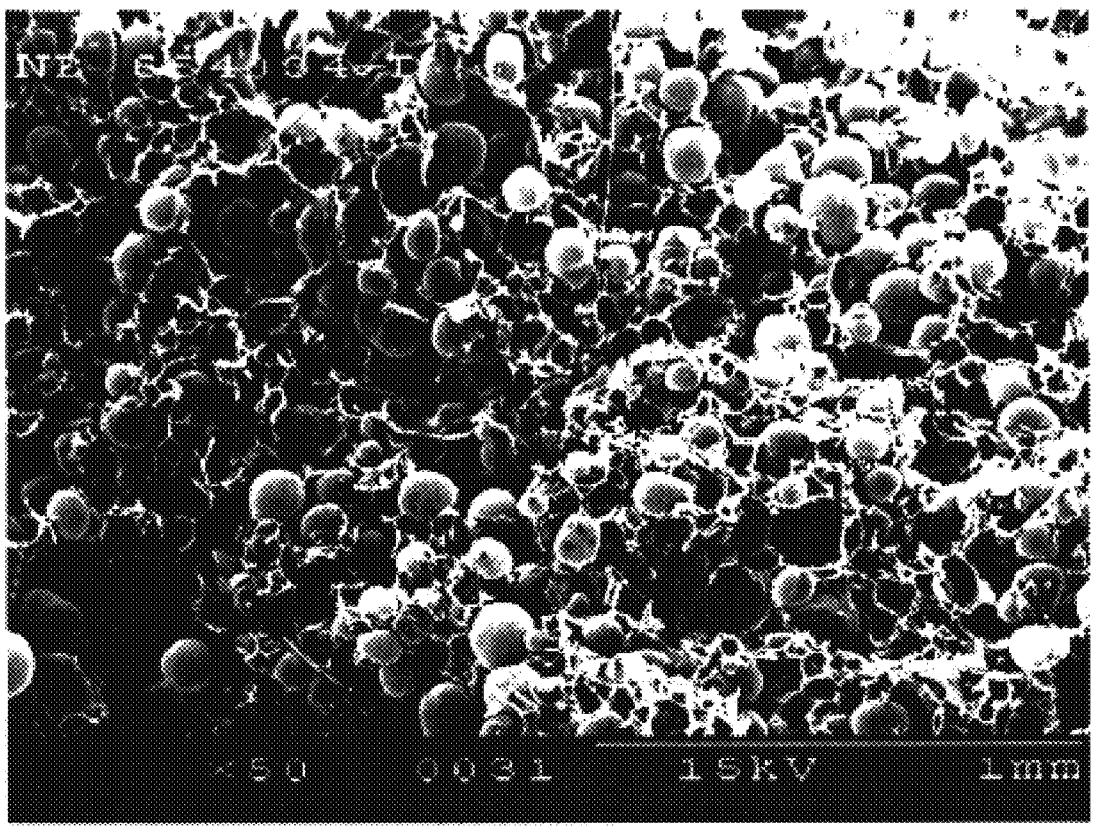
FIG. 4 is a micrograph showing the same magnification of a foam of the present invention wherein the large spherical cells are embedded in the water/isocyanate foam.
Figure 5:
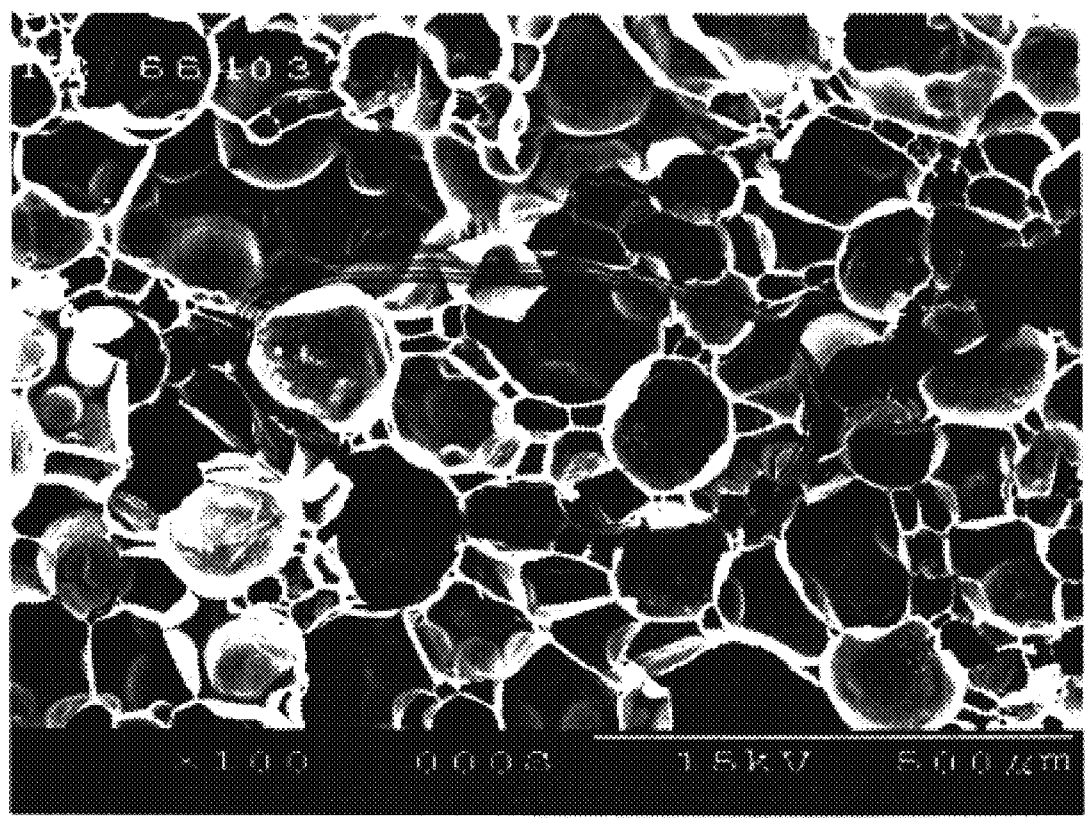
FIG. 5 is a micrograph which is a further magnification of FIG. 4 showing an example of the microspheres joined by the water/isocyanate cells.

Since the present foam is a syntactic foam having a bimodal cell structure, the microspheres will have a diameter of at least twice the diameter of the cells. This is illustrated in FIG. 1 wherein Region "A" represents the microsphere, Region "B" shows the triangular plateau border and Region "C" shows the microsphere shell. The small cells of the PUR/PIR foam are found between the microspheres' shells and in the triangular plateau borders. For example, if a microsphere has a diameter of 80 microns, the PUR/PIR cell diameter will be no greater than 40 microns. FIG. 2 shows how the compressive strength is increased by making a sandwich beam from the small PUR/PIR cells between the shells of the microspheres. Whereas FIG. 3 shows a micrograph of a typical, non-syntactic PIR foam with random and widely distributed cell sizes, FIGS. 4 and 5 show a foam of the present invention wherein the large spherical cells are embedded in the water/isocyanate foam.

The production of rigid foams of the present invention based on isocyanates is known per se and is described, for example, in German Offenlegungsschriften 1,694,142, 1,694,215 and 1,720,768, as well as in Kunststoff-Handbuch [Plastics Handbook], Volume VII, Polyurethane, edited by Vieweg and Hochtlen, Carl Hanser Verlag, Munich 1966, and in the new edition of this tome, edited by G. Oertel, Carl Hanser Verlag, Munich, Vienna, 1983.

These foams are mainly those that comprise urethane and/or isocyanurate and/or allophanate and/or uretdione and/or urea and/or carbodiimide groups. The following can be employed for the production of the bimodal syntactic foams based on isocyanates, using the microspheres according to the present invention:

a) As starting components, aliphatic, cycloaliphatic, araliphatic, aromatic and heterocyclic polyisocyanates, such as those described, for example, by W. Siefken in Justus Liebigs Annalen der Chemie, 562, pp. 75–136, for example, those of the formula $$Q(NCO)_n$$

in which n denotes 2–4, preferably 2–3, and Q denotes an aliphatic hydrocarbon radical of 2–18, preferably 6–10 carbon atoms, a cycloaliphatic hydrocarbon radical of 4–15, preferably 5–10 carbon atoms, an aromatic hydrocarbon radical of 6–15, preferably 6–13 carbon atoms or an araliphatic hydrocarbon radical of 8–15, preferably 8–13 carbon atoms, for example, such polyisocyanates as described in DE-OS 2,832,253, pp 10–11.

Particularly preferred are usually those polyisocyanates which are technically readily accessible, for example, the 2,4- and 2,6-toluylene diisocyanate as well as any mixture of these isomers ("TDI"); polyphenyl-polymethylenepolyisocyanates, such as those obtained by an aniline-formaldehyde condensation and subsequent treatment with phosgene ("crude MDI"), and polyisocyanates comprising carbodiimide groups, urethane groups, allophanate groups, isocyanurate groups, urea groups or biuret groups ("modified polyisocyanates"), especially those modified polyisocyanates which are derived from 2,4-and/or 2,6-toluylene diisocyanate and from 4,4'-and/or 2,4'-diphenylmethane diisocyanate.

b) The starting components may further be compounds of a molecular weight usually of 400 to 10,000, containing at least two hydrogen atoms reactive toward isocyanates. These comprise, besides compounds containing amino, thio, or carboxyl groups, preferably compounds containing hydroxyl groups, in particular compounds containing 2 to 8 hydroxyl groups, especially those of a molecular weight of 1,000 to 6,000, preferably 2,000 to 6,000, for example polyethers and polyesters as well as polycarbonates and polyester amides containing at least 2, usually 2 to 8, preferably 2 to 6 hydroxyl groups; these compounds are known per se for the preparation of homogenous and cellular polyurethanes and are disclosed, for example in DE-OS 2,832,253, pp. 11–18.

c) When appropriate, compounds comprising at least two hydrogen atoms reactive toward isocyanates and of a molecular weight of 32 to 399 may be used as further starting components. Also, in this case, compounds containing hydroxyl groups and/or amino groups and/or thiol groups and/or carboxyl groups, preferably compounds containing hydroxyl groups and/or amino groups, are understood to be those which are used as chain lengtheners or crosslinking agents. These compounds usually have 2 to 8, preferably 2 to 4 hydrogen atoms reactive toward isocyanates. Appropriate examples are disclosed in DE-OS 2,832,253, pp. 19–20.

d) The blowing agents which may be used in the process of the present invention include water and/or readily volatile inorganic or organic substances and other auxiliary volatile blowing agents typically used to blow PUR/PIR foams. Organic blowing agents include acetone, ethylacetate; halogen-substituted alkanes, such as methylene chloride, chloroform, ethylidene chloride, vinylidene chloride, monofluoro-trichloromethane, chlorodifluoromethane, dichlorodifluoromethane, dichlorodifluoroethane, dichlorotrifluoroethane; also butane, hexane, heptane or diethyl ether. Specific examples of such blowing agents include: 1,1,1,4, 4,4-hexafluorobutane (HFC-356); 1,1-dichloro-1-fluoroethane (HFC-141b); the tetrafluoroethanes such as 1,1,1,2-tetrafluoroethane (HFC-134a); the pentafluoropropanes such as 1,1,2,2,3-pentafluoropropane (HFC-245ca), 1,1,2,3,3-pentafluoropropane (HFC-245ea), 1,1,1,2,3-pentafluoropropane (HFC-245eb), and 1,1,1,3,3-pentafluoropropane (HFC-245fa); the hexafluoropropanes such as 1,1,2,2,3,3-hexafluoropropane (HFC-236ca), 1,1,1, 2,2,3-hexafluoro-propane (HFC-236cb), 1,1,1,2,3,3-hexafluoro-propane (HFC-236ea), 1,1,1,3,3,3-hexafluoropropane (HFC-236fa); the pentafluorobutanes such as 1,1,1,3,3-pentafluorobutane (HFC-365); and difluoroethanes such as 1,1-difluoroethane (HFC-152a). Inorganic blowing agents are, for example, air, $CO_2$ or $N_2O$. A blowing effect may also be obtained by adding compounds which decompose at temperatures above room temperature giving off gases, such as azodicarbonamide or azoisobutyronitrile. Other examples of blowing agents may be found in Kunststoff-Handbuch, Vol. VII, by Vieweg and Hochtlen, Carl-Hanser-Verlag, Munich, 1966, on pages 108 and 109, 453 to 455 and 507 to 510.

e) When appropriate, other auxiliary agents and additives may be used at the same time, such as:

water and/or other highly volatile organic substances as propellants;

additional catalysts of the type known per se in amounts up to 10% by weight, based on the component b);

surface-active additives, such as emulsifiers and foam stabilizers, and reaction retardants, for example acidic substances such as hydrochloric acid or organic acid halides, also cell regulators of the type known per se, such as paraffins or fatty alcohols or dimethylpolysiloxanes, as well as, pigments or dyes and other flame retardants of the type known per se, for example tricresyl phosphate, also stabilizers against the effect of aging and weathering, plasticizers and fungistats and bacteriostats as well as fillers such as barium sulphate, kieselguhr, carbon black or whiting.

Other examples of surface active additives, foam stabilizers, cell regulators, reaction retardants, stabilizers, flame retardants, plasticizers, dyes, fillers, fungistats, bacteriostats to be used at the same time if appropriate, as well as details concerning the use and action of these additives are described in Kunststoff-Handbuch [Plastics Handbook], Volume VII, edited by Vieweg and Hochtlen, Carl Hanser Verlag, Munich 1966, for example on pages 103–113.

The isocyanate-based foams can be prepared in a manner known per se.

The preparation of polyurethane plastics may be prepared for example, as follows: the reactants are caused to react by the single-stage process known per se, the prepolymer process or the semiprepolymer process, frequent use being made of plant machinery, for example that disclosed in U.S. Pat. No. 2,764,565. Details concerning the processing plant which are likewise relevant according to the invention, are described in Kunststoff-Handbuch, Volume VII, edited by Vieweg and Hochtlen, Carl Hanser Verlag, Munich 1966, for example on pages 121–205. Because of the inherently high viscosities of formulations containing high loadings of microspheres, additional processing considerations are necessary. One commercial solution is the use of an extruder for mixing and metering the slurry containing the microspheres. Such technology, for example is disclosed in U.S. Pat. No. 5,424,014.

The products obtainable according to the present invention may be used, for example, as energy absorbing foams; insulation for appliances; laminated boards as exterior wall elements, roof insulating board, interior walls, insulated doors, etc.

The following examples further illustrate details for the preparation and use of the compositions of this invention. The invention, which is set forth in the following disclosure, is not to be limited either in spirit or scope by these examples.

EXAMPLES

In the examples which follow, these materials were used:

1) POLYOL: A phthalic anhydride and diethylene glycol polyester polyol commercially available from Stepan Chemical as Stepanpol 2352 having a molecular weight of 468, an OH number of 240, a functionality of about 2.

2) B-84PI: Tegostab® B-84-PI, a polysiloxane polyether surfactant available from Th. Goldschmidt.

3) K-HEX: 70% potassium hexanoate in diethylene glycol commercially available from Air Products.

4) Polycat 46: potassium acetate in ethylene glycol commercially available from Air Products.

5) Desmorapid PV: N,N',N' Pentamethyl diethylenetriamine commercially available from Bayer AG.

6) Water:

7) HCFC 141b: a blowing agent, dichlorofluoroethane, available from DuPont.

8) ISO: A polymeric diphenylmethane diisocyanate having an NCO content of 30.6% and a Brookfield viscosity at 25° C. of 700 mPa·s which is commercially available from Bayer Corporation under the designation Mondur 489.

9) DE 551–120: A polymeric microsphere available from Expancel Corp.

10) DE 551: A polymeric microsphere available from Expancel Corp.

11) Q-cel 650: A glass microsphere available from PQ Corporation.

12) Q-cel 300: A glass microsphere available from PQ Corporation.

Example 1

A control formulation with no microspheres was prepared using 35.4 wt. % HCFC 141b and 0.5 wt. % water. This foam had a free rise density of 1.9 pcf, a compressive strength (by ASTM D-1621) of 23 psi, a freeze stable density (by ASTM D-1622) of 1.7 pcf, and a foam cell diameter of 150 microns. These properties are typical for rigid foams used in laminated board construction. Higher compressive strength would allow for thinner boards to be produced or for lower free rise density, which would reduce weight and cost. Lower freeze stable density indicates better dimensional stability of the board.

Example 2

A formulation with 60 wt. % microspheres was prepared to produce a hybrid syntactic bimodal foam. This formulation used no HCFC 141b and 0.75 wt. % water. The microsphere diameter used was 120 microns and the foam cell diameter was 30 microns and the foam had a free rise density of 1.9 pcf. Its compressive strength was 86 psi and freeze stable density was 1.2 pcf. The compressive strength and freeze stable density are far superior to those of Example 1 (the control).

Example 3

Another formulation with 60 wt. % microspheres was prepared to produce a hybrid syntactic bimodal foam. This formulation used 35.4 wt. % HCFC 141b and 0.5 wt. % water. In this formulation, the microsphere diameter was 120 microns and the foam cell diameter was 60 microns and the foams had a free rise density of 1.4 pcf. Its compressive strength was 28 psi and freeze stable density was 1.3 pcf. This shows that, at comparable compressive strength to the control, both the free rise density and the freeze stable density can be significantly reduced.

Example 4

A formulation with 60 wt. % microspheres was prepared. This formulation used no HCFC 141b and 0.75 wt %. The microsphere diameter was 50 microns and the foam cell diameter was about 120 microns. This formulation used a polymeric microsphere. The resulting foam gave a free rise density of ca. 1.8 pcf and represented the opposite bimodal structure to the present invention (i.e. the foam cell diameter is about twice the microsphere diameter). The compressive strength and freeze stable density are comparable to those of the control.

Example 5

Another formulation with 60 wt. % microspheres was prepared; This formulation used 35.4 wt. % HCFC 141b and 0.5 wt. % water. The microsphere diameter was 50 microns and the foam cell diameter was about 120 microns. In this formulation, a glass microsphere was used. The resulting foam gave a free rise density of ca. 1.8 pcf and represented the opposite bimodal structure to the present invention (i.e. the foam cell diameter is about twice the microsphere diameter). The compressive strength and freeze stable density are comparable to those of the control. This foam required typical levels of HCFC 141b to achieve the desired free rise density. We believe this was due to the high rate of breakage of the glass microspheres during processing.

Example 6

Another formulation with 60 wt. % microspheres was prepared using no HCFC 141b and 0.75 wt. % water. In this formulation, the microsphere diameter was roughly equal to the foam cell diameter, making a hybrid syntactic foam, but not bimodal. Polymeric microspheres were used. The foam resulted in a free rise density of 1.9 pcf and the compressive strength and freeze stable density are comparable to those of the control.

Example 7

Another formulation with 60 wt. % microspheres was prepared having no HCFC 141b and 0.75 wt. % water. In this formulation, the microsphere diameter was roughly equal to the foam cell diameter, making a hybrid syntactic foam, but not bimodal. Glass microspheres were used which resulted in foams having a free rise density of 1.9 pcf. The compressive strength and freeze stable density were comparable to those of the control.

TABLE 1

| Examples | 1 | 2 | 3 | 4 | 5 | 6 | 7 |
|---|---|---|---|---|---|---|---|
| Microsphere type |  | Poly | Poly | Poly | Glass | Poly | Glass |
| Microsphere Diameter, microns | 0 | 120 | 120 | 50 | 50 | 120 | 100 |
| Foam cell diameter microns | 150 | 30 | 60 | 120 | 120 | 110 | 120 |
| Polyol wt. % | 70.7 | 70.7 | 70.7 | 70.7 | 70.7 | 70.7 | 70.7 |
| B-84-PI wt. % | 1.41 | 1.41 | 1.41 | 1.41 | 1.41 | 1.41 | 1.41 |
| K-HEX wt. % | 1.41 | 1.41 | 1.41 | 1.41 | 1.41 | 1.41 | 1.41 |
| Polycat 46 wt. % | 0.28 | 0.28 | 0.28 | 0.28 | 0.28 | 0.28 | 0.28 |
| Desmorapid PV wt. % | 0.25 | 0.25 | 0.25 | 0.25 | 0.25 | 0.25 | 0.25 |
| ISO wt. % | 125.6 | 435.0 | 125.6 | 135.0 | 125.6 | 135.0 | 135.0 |
| HCFC 141b wt. % | 35.4 | 0 | 35.4 | 0 | 35.4 | 0 | 0 |
| Water, wt. % | 0.5 | 0.75 | 0.5 | 0.75 | 0.5 | 0.75 | 0.75 |
| DE 551-120 wt. % | 0 | 60 | 60 | 0 | 0 | 60 | 0 |
| DE 551 wt. % | 0 | 0 | 0 | 60 | 0 | 0 | 0 |
| Q-cel 650 wt. % | 0 | 0 | 0 | 0 | 60 | 0 | 0 |
| Q-cel 300 wt. % | 0 | 0 | 0 | 0 | 0 | 0 | 60 |
| Free rise Density, pcf | 1.9 | 1.9 | 1.4 | 1.75 | 1.8 | 1.9 | 1.95 |
| Compressive strength, psi | 23 | 86 | 28 | 21 | 22 | 26 | 24 |
| Freeze stable density, pcf | 1.7 | 1.2 | 1.3 | 1.7 | 1.7 | 1.5 | 1.7 |

Whereas, particular embodiments of this invention have been described herein for purposes of illustration, it will be evident to those skilled in the art that numerous variations in the details may be made without departing from the invention as described in the claims appended hereto.

What is claimed is:

1. A hybrid bimodal syntactic rigid polyurethane product and/or polyisocyanurate (PIR) product having a high compressive strength comprising:

a) from 20 to 80 percent by weight of hollow microspheres, said microspheres having average diameters of from 80–200 microns and being encapsulated in b) from 80 to 20 percent by weight of a closed cell polyurethane foam, the cells of said foam having average diameters of from 0.01 to 60 microns, wherein the ratio of the average diameter of said microspheres to the average diameter of said cells is at least 2:1.

2. A hybrid bimodal syntactic rigid polyurethane and/or PIR product according to claim 1 wherein said weight of said hollow microspheres in said rigid polyurethane product is from 40 to 60 weight percent.

3. A hybrid bimodal syntactic rigid polyurethane and/or PIR product according to claim 1 wherein said average diameters of said hollow microspheres range from 100 to 140 microns.

4. A hybrid bimodal syntactic rigid polyurethane product according to claim 1 wherein said average diameters of said cells of said foam range from 0.5 to 30 microns.

5. A hybrid bimodal syntactic rigid polyurethane product according to claim 1 wherein said microsphere comprises a thin shell of a copolymer of vinyl chloride, vinylidene chloride and/or acrylonitrile.

6. A hybrid bimodal syntactic rigid polyurethane product according to claim 5 wherein said interior of said microsphere comprises a hydrocarbon gas.

7. A hybrid bimodal syntactic rigid polyurethane product according to claim 6 wherein said hydrocarbon gas is selected from the group consisting of cyclopentane, isobutane and pentane.

8. A hybrid bimodal syntactic rigid polyurethane product according to claim 1 wherein said microsphere comprises a ceramic shell.

9. A hybrid bimodal syntactic rigid polyurethane product according to claim 1 wherein said microsphere comprises a glass shell.

10. A hybrid bimodal syntactic rigid polyurethane product according to claim 8 wherein said interior of said microsphere comprises a vacuum.

11. A hybrid bimodal syntactic rigid polyurethane product according to claim 9 wherein said interior of said microsphere comprises a vacuum.

* * * * *